United States Patent
Sawamura et al.

(10) Patent No.: US 9,205,382 B2
(45) Date of Patent: Dec. 8, 2015

(54) CARBON DIOXIDE SEPARATION SYSTEM

(75) Inventors: Ken-ichi Sawamura, Osaka (JP);
Yoshinobu Takaki, Osaka (JP);
Yoshihiro Asari, Osaka (JP)

(73) Assignee: Hitachi Zosen Corporation, Osaka-shi (JP)

( * ) Notice: Subject to any disclaimer, the term of this patent is extended or adjusted under 35 U.S.C. 154(b) by 71 days.

(21) Appl. No.: 14/116,739

(22) PCT Filed: May 10, 2012

(86) PCT No.: PCT/JP2012/062029
§ 371 (c)(1),
(2), (4) Date: Feb. 18, 2014

(87) PCT Pub. No.: WO2012/153808
PCT Pub. Date: Nov. 15, 2012

(65) Prior Publication Data
US 2014/0144321 A1    May 29, 2014

(30) Foreign Application Priority Data
May 11, 2011    (JP) .................................. 2011-105880

(51) Int. Cl.
*B01D 53/22*    (2006.01)
*B01D 53/14*    (2006.01)
*B01D 53/047*    (2006.01)
*B01D 71/02*    (2006.01)
*C10L 3/10*    (2006.01)

(52) U.S. Cl.
CPC ............ *B01D 71/028* (2013.01); *B01D 53/047* (2013.01); *B01D 53/1493* (2013.01);
(Continued)

(58) Field of Classification Search
CPC ............ B01D 53/047; B01D 53/1475; B01D 53/1493; B01D 53/22; B01D 53/228; B01D 53/229; B01D 71/028; B01D 2257/504; C19L 3/101; C19L 3/104
USPC ................................ 96/4; 95/45, 51, 139, 236
See application file for complete search history.

(56) References Cited

U.S. PATENT DOCUMENTS

2006/0079725 A1 * 4/2006 Li et al. .......................... 585/818
2010/0116130 A1 * 5/2010 Carreon et al. .................. 95/45
(Continued)

FOREIGN PATENT DOCUMENTS

| JP | 62-167390 A | 7/1987 |
| JP | 06-099035 A | 4/1994 |
| JP | 2008-247636 A | 10/2008 |

OTHER PUBLICATIONS

P. Bernardo et al., "Membrane Gas Separation: A Review/State of the Art", Ind. Eng. Chem. Res. 48 (2009), pp. 4638-4663.
(Continued)

*Primary Examiner* — Jason M Greene
(74) *Attorney, Agent, or Firm* — Locke Lord LLP (57) ABSTRACT

In the carbon dioxide separation system, a mixed gas having a carbon dioxide concentration of 3 to 75% is introduced into a primary carbon dioxide separation device equipped with a zeolite membrane for carbon dioxide separation to produce a primary permeated gas having a carbon dioxide concentration of 80% or more on the permeate side of the zeolite membrane and also reduce the carbon dioxide concentration of a primary gas on the non-permeate side of the zeolite membrane to 3 to 15%. Next, the primary gas on the non-permeate side is introduced into a secondary carbon dioxide separation device that employs an amine absorption method or a pressure swing adsorption (PSA) method to produce a secondary separated gas having a carbon dioxide concentration of 80% or more separated by the separation device and also produce a carbon-dioxide-removed gas having a carbon dioxide concentration of 2% or less.

16 Claims, 2 Drawing Sheets (52) U.S. Cl.
    CPC .............. *B01D53/22* (2013.01); *B01D 53/229*
        (2013.01); *C10L 3/101* (2013.01); *C10L 3/104*
        (2013.01); *B01D 53/1475* (2013.01); *B01D*
        *2257/504* (2013.01); *Y02C 10/04* (2013.01);
        *Y02C 10/06* (2013.01); *Y02C 10/08* (2013.01);
        *Y02C 10/10* (2013.01)

(56) References Cited

U.S. PATENT DOCUMENTS

| | | |
|---|---|---|
| 2010/0129284 A1 | 5/2010 | Niitsuma et al. |
| 2011/0023710 A1* | 2/2011 | Sorensen et al. ................. 95/50 |
| 2011/0094378 A1* | 4/2011 | Mitariten ......................... 95/50 |
| 2011/0290110 A1* | 12/2011 | Zhou et al. ....................... 95/45 |
| 2011/0290111 A1* | 12/2011 | Dunne et al. ..................... 95/51 |
| 2011/0315010 A1* | 12/2011 | Doong et al. .................... 95/46 |
| 2012/0061614 A1* | 3/2012 | Calabro et al. ................ 252/184 |
| 2012/0111192 A1* | 5/2012 | Nazarko et al. ................... 95/51 |

OTHER PUBLICATIONS

International Search Report dated Aug. 21, 2012, issued for PCT/JP2012/062029.

* cited by examiner

CARBON DIOXIDE SEPARATION SYSTEM

TECHNICAL FIELD

The present invention relates to a carbon dioxide separation system for recovering carbon dioxide ($CO_2$) from a mixed gas having a carbon dioxide concentration of 3 to 75%.

BACKGROUND ART

In recent years, carbon dioxide, a typical global warming gas, has been discharged from power plants, cement plants, steel plants, chemical plants, etc. In terms of the prevention of global warming, there an urgent need to develop a high-efficiency carbon dioxide recovery technology. In addition, carbon dioxide is also present in natural gases containing methane as a main component, and, in terms of the prevention of pipeline corrosion, carbon dioxide needs to be recovered and removed from methane in addition, in an integrated coal gasification combined cycle, an attempt has been made in which finely pulverized coal is pyrolyzed and gasified to produce, through a shift reaction, a gas containing hydrogen and carbon dioxide as main components, and then carbon dioxide is separated to use the resulting hydrogen-rich gas as a fuel gas.

Conventionally, as methods for recovering carbon dioxide, technologies including amine absorption and like chemical absorption methods, pressure swing adsorption (PSA) and like physical adsorption methods, and the like have been used. However, because the energy consumption for the regeneration of the absorbing liquid or adsorbent is high, the development of a higher-efficiency recovery method has been expected.

Incidentally, a membrane separation method using a zeolite membrane allows for continuous operation and does not require the regeneration of an absorbing liquid or adsorbent, and thus is increasingly expected to serve as a high-efficiency carbon dioxide recovery technology.

For example, Nonpatent Document 1 shows an example in which carbon dioxide or nitrogen is separated from a natural gas containing methane as a main component by membrane separation using a zeolite membrane.

Meanwhile, in a membrane separation method, the pressure difference through a zeolite membrane is the driving force for gas permeation. Therefore, the carbon dioxide concentration on the non-permeate side of the zeolite membrane decreases with the removal and recovery of carbon dioxide, and thus the reality is that the separation efficiency decreases in a region of low concentration of carbon dioxide.

For the above reasons, Patent Document 1, for example, proposes a hybrid process of a zeolite membrane for separation and a pressure swing adsorption (PSA) method, in which for the separation and recovery of carbon dioxide from an exhaust gas, carbon dioxide is first primarily concentrated in a membrane separation apparatus, and further secondarily concentrated in an adsorption separation apparatus, thereby recovering high-concentration carbon dioxide.

PRIOR ART DOCUMENTS

Patent Documents

Patent Document 1: JP-A-6-99035
Nonpatent Document 1: P. Bernardo et al., "Membrane Gas Separation: A Review/State of the Art", Ind. Eng. Chem. Res. 48 (2009), 4638-4663

SUMMARY OF THE INVENTION

Problems that the Invention is to Solve

However, the reality is that according to the conventional process described in Patent Document 1, although high-concentration carbon dioxide can be obtained, carbon dioxide remaining on the non-permeate side of the membrane cannot be recovered. For example, in the case where the non-permeated gas is a valuable gas, such as methane or hydrogen, in terms of valuable gas utilization, carbon dioxide on the non-permeate side also needs to be recovered.

In addition, in many of the processes that require carbon dioxide separation, such as natural gas purification and integrated coal gasification combined cycles, the process is generally carried out at a high pressure of 2 MPa or more. Accordingly, there has been a problem in that even when membrane separation is applied, the separation membrane used is required to have high durability.

As described above, conventional processes have been problematic in that in terms of facilities, it is inevitably inefficient to separate a mixed gas having a wide range of carbon dioxide concentration and pressure into a high-concentration carbon dioxide gas having a carbon dioxide concentration of 80% or more and a carbon-dioxide-removed gas having a carbon dioxide concentration of 2% or less.

An object of the invention is to provide a carbon dioxide separation system that allows a mixed gas having a wide range of carbon dioxide concentration and pressure to be efficiently separated into a high-concentration carbon dioxide gas and a carbon-dioxide-removed gas.

Means for Solving the Problems

In light of the above points, the present inventors have conducted extensive research. As a result, they have found that by a hybrid system that combines a membrane separation method using a zeolite membrane for carbon dioxide separation including a zeolite membrane layer with an amine absorption method or a pressure swing adsorption (PSA) method to have a specific arrangement and operating conditions, a carbon-dioxide-containing mixed gas can be highly efficiently separated into a high-concentration carbon dioxide gas having a carbon dioxide concentration of 80% or more and a carbon-dioxide-removed gas having a carbon dioxide concentration of 2% or less, and thus accomplished the invention.

In order to achieve the above object, the invention of claim 1, a carbon dioxide separation system, is characterized in that a mixed gas (1) having a carbon dioxide concentration of 3 to 75% is introduced into a primary carbon dioxide separation device (4) equipped with a zeolite membrane (5) for carbon dioxide separation to produce a primary permeated gas (6) having a carbon dioxide concentration of 80% or more on the permeate side of the zeolite membrane (5) for carbon dioxide separation and also reduce the carbon dioxide concentration of a primary gas (7) on the non-permeate side of the zeolite membrane (5) for carbon dioxide separation to 3 to 15%, and then the primary gas (7) on the non-permeate side is introduced into a secondary carbon dioxide separation device (8) that employs an amine absorption method or a pressure swing adsorption (PSA) method to produce a secondary separated gas (9) having a carbon dioxide concentration of 80% or more separated by the secondary carbon dioxide separation device (8) and also produce a carbon-dioxide-removed gas (10) having a carbon dioxide concentration of 2% or less.

The invention of claim 2, a carbon dioxide separation system, is characterized in that a mixed gas (1) having a carbon dioxide concentration of 3 to 75% is introduced into a primary carbon dioxide separation device (4) equipped with a zeolite membrane (5) for carbon dioxide separation to produce a primary permeated gas (6) containing permeated carbon dioxide on the permeate side of the zeolite membrane (5) for carbon dioxide separation and also reduce the carbon dioxide concentration of a primary gas (7) on the non-permeate side of the zeolite membrane (5) for carbon dioxide separation to 3 to 15%, then the primary gas (7) on the non-permeate side is introduced into a secondary carbon dioxide separation device (8) that employs an amine absorption method or a pressure swing adsorption (PSA) method to produce a secondary separated gas (9) containing carbon dioxide separated by the secondary carbon dioxide separation device (8) and also produce a carbon-dioxide-removed gas (10) having a carbon dioxide concentration of 2% or less, and the primary permeated gas (6) containing carbon dioxide discharged from the zeolite membrane (5) for carbon dioxide separation and the secondary separated gas (9) containing carbon dioxide discharged from the secondary carbon dioxide separation device (8) are mixed to produce a carbon-dioxide-concentrated gas (11) having a carbon dioxide concentration of 80% or more.

The invention of claim. 3 is the carbon dioxide separation system according to claim 1 or 2, characterized in, that the mixed gas (1) having a carbon dioxide concentration of 3 to 75% is a gas containing carbon dioxide ($CO_2$) and also containing at least one gas selected from the group consisting of hydrogen ($H_2$) nitrogen ($N_2$), oxygen ($O_2$), and methane and at least one impurity selected from the group consisting of water ($H_2O$) hydrogen sulfide ($H_2S$), nitrogen oxides (NOx) sulfur oxides (SOx), and hydrocarbons other than methane, and an impurity removal device (2) for removing the impurity is provided upstream of the primary carbon dioxide separation device (4) equipped with the zeolite membrane (5) for carbon dioxide separation.

The invention of claim 4 is the carbon dioxide separation system according to any one of claims 1 to 3, characterized in that the zeolite membrane (5) for carbon dioxide separation includes a faujasite (FAU)-type zeolite membrane layer.

The invention of claim 5 is the carbon dioxide separation system according to any one of claims 1 to 3, characterized in that the zeolite membrane (5) for carbon dioxide separation includes a chabazite (CHA)-type zeolite membrane layer.

The invention of claim 6 is the carbon dioxide separation system according to any one of claims 1 to 3, characterized in that the zeolite membrane (5) for carbon dioxide separation includes a ZSM-5 (MFI)-type zeolite membrane layer.

The invention of claim 7 is the carbon dioxide separation system according to any one of claims 1 to 3, characterized in that the zeolite membrane (5) for carbon dioxide separation includes a DDR-type zeolite membrane layer.

The invention of claim 8 is the carbon dioxide separation system according to any one of claims 1 to 7, characterized in that the zeolite membrane (5) for carbon dioxide separation includes a zeolite membrane layer dehydrated by heating at a temperature of 100 to 600° C. for drying and then kept in the dry state.

The invention of claim 9 is the carbon dioxide separation system according to any one of claims 1 to 8, characterized in that the carbon dioxide separation system is for being installed in an integrated coal gasification combined cycle plant and used for the removal of carbon dioxide from a gas that has undergone an exhaust gas shift reaction or for being installed in a natural gas purification plant in a natural gas field and used for the removal of carbon dioxide from a natural gas, and the carbon dioxide separation system is movable on land or at sea after the integrated coal gasification combined cycle plant or the natural gas purification plant is closed.

Advantage of the Invention

The invention of claim 1, the carbon dioxide separation system, is characterized in that a mixed gas (1) having a carbon dioxide concentration of 3 to 75% is introduced into a primary carbon dioxide separation device (4) equipped with a zeolite membrane (5) for carbon dioxide separation to produce a primary permeated gas (6) having a carbon dioxide concentration of 80% or more on the permeate side of the zeolite membrane (5) for carbon dioxide separation and also reduce the carbon dioxide concentration of a primary gas (7) on the non-permeate side of the zeolite membrane (5) for carbon dioxide separation to 3 to 15%, and then the primary gas (7) on the non-permeate side is introduced into a secondary carbon dioxide separation device (8) that employs an amine absorption method or a pressure swing adsorption method (PSA) to produce a secondary separated gas (9) having a carbon dioxide concentration of 80% or more separated, by the secondary carbon dioxide separation device (8) and also produce a carbon-dioxide-removed gas (10) having a carbon dioxide concentration of 2% or less. The invention of claim 1 is advantageous in that a mixed gas having a wide range of carbon dioxide concentration and pressure can be efficiently separated into a high-concentration carbon dioxide gas and a carbon-dioxide-removed gas.

The invention of claim 2, the carbon dioxide separation system, is characterized in that a mixed gas (1) having a carbon dioxide concentration of 3 to 75% is introduced into a primary carbon dioxide separation device (4) equipped with a zeolite membrane (5) for carbon dioxide separation to produce a primary permeated gas (6) containing permeated carbon dioxide on the permeate side of the zeolite membrane (5) for carbon dioxide separation and also reduce the carbon dioxide concentration of a primary gas (7) on the non-permeate side of the zeolite membrane (5) for carbon dioxide separation to 3 to 15%, then the primary gas (7) on the non-permeate side is introduced into a secondary carbon dioxide separation device (8) that employs an amine absorption method or a pressure swing adsorption method (PSA) to produce a secondary separated gas (9) containing carbon dioxide separated by the secondary carbon dioxide separation device (8) and also produce a carbon-dioxide-removed gas (10) having a carbon dioxide concentration of 2% or less, and the primary permeated gas (6) containing carbon dioxide discharged from the zeolite membrane (5) for carbon dioxide separation and the secondary separated gas (9) containing carbon dioxide discharged from the secondary carbon dioxide separation device (8) are mixed to produce a carbon-dioxide-concentrated gas (11) having a carbon dioxide concentration of 80% or more. The invention of claim 2 is similarly advantageous in that a mixed gas having a wide range of carbon dioxide concentration and pressure can be efficiently separated into a high-concentration carbon dioxide gas and a carbon-dioxide-removed gas.

The invention of claim 3 is the carbon dioxide separation system according to claim 1 or 2, characterized in that the mixed gas (1) having a carbon dioxide concentration of 3 to 75% is a gas containing carbon dioxide ($CO_2$) and also containing at least one gas selected from the group consisting of hydrogen ($H_2$), nitrogen ($N_2$), oxygen ($O_2$), and methane and at least one impurity selected from the group consisting of water ($H_2O$), hydrogen sulfide ($H_2S$), nitrogen oxides (NOx), sulfur oxides (SOx), and hydrocarbons other than methane, and an impurity removal device (2) for removing the impurity is provided upstream of the primary carbon dioxide separation device (4) equipped with the zeolite membrane (5) for carbon dioxide separation. The invention of claim 3 is advantageous in that the primary carbon dioxide separation device (4) and the zeolite membrane (5) for carbon dioxide separation, which are provided downstream, can be prevented from being contaminated and degraded by the impurity.

The invention of claim 4 is the carbon dioxide separation system according to any one of claims 1 to 3, characterized in that the zeolite membrane (5) for carbon dioxide separation includes a faujasite (FAU)-type zeolite membrane layer. The invention of claim 4 is advantageous in that because of the strong adsorption between a FAU-type zeolite membrane and carbon dioxide, carbon dioxide can be permeated and separated with high selectivity from a gas such as hydrogen ($H_2$), methane, nitrogen ($N_2$), or oxygen ($O_2$).

The invention of claim 5 is the carbon dioxide separation system according to any one of claims 1 to 3, characterized in that the zeolite membrane (5) for carbon dioxide separation includes a chabazite (CHA)-type zeolite membrane layer, such as SAPO-34. The invention of claim 5 is advantageous in that because of the uniform, rigid 0.38-nm-diameter pore structure of CHA-type zeolite, small-molecule carbon dioxide (diameter: 0.33 nm) can be permeated and removed with high selectivity from large-molecule methane (diameter: 0.38 nm) like a molecular sieve.

The invention of claim 6 is the carbon dioxide separation system according to any one of claims 1 to 3, characterized in that the zeolite membrane (5) for carbon dioxide separation includes a ZSM-5 (MFI)-type zeolite membrane layer. The invention of claim 6 is advantageous in that although the carbon dioxide permeation and separation performance is inferior to a FAU-type zeolite membrane, high durability can be obtained.

The invention of claim 7 is the carbon dioxide separation system according to any one of claims 1 to 3, characterized in that the zeolite membrane (5) for carbon dioxide separation includes a DDR-type zeolite membrane layer. The invention of claim 7 is advantageous in that because of the hydrophobicity of a DDR-type zeolite membrane, the membrane permeation of carbon dioxide can be prevented from being inhibited by moisture. At the same time, because of the difference in diffusibility in the pore structure of a DDR-type zeolite membrane layer, carbon dioxide can be permeated and separated from methane with high selectivity.

The invention of claim 8 is the carbon dioxide separation system according to any one of claims 1 to 7, characterized in that the zeolite membrane (5) for carbon dioxide separation includes a zeolite membrane layer dehydrated by heating at a temperature of 100 to 600° C. for drying and then kept in the dry state. The invention of claim 8 is advantageous in that crystal water in the zeolite pores is removed, whereby high carbon dioxide permeability can be obtained.

The invention of claim 9 is the carbon dioxide separation system according to any one of claims 1 to 8, characterized in that the carbon dioxide separation system is for being installed in an integrated coal gasification combined cycle plant and used for the removal of carbon dioxide from a gas that has undergone an exhaust gas shift reaction or for being installed in a natural gas purification plant in a natural gas field and used for the removal of carbon dioxide from a natural gas, and the carbon dioxide separation system is movable on land or at sea after the integrated coal gasification combined cycle plant or the natural gas purification plant is closed. The invention of claim 9 is advantageous in that in the case where the carbon dioxide separation system of the invention is used for the removal of carbon dioxide from a gas that has undergone an exhaust gas shift reaction in an integrated coal gasification combined cycle plant, for example, after the integrated coal gasification combined cycle plant is closed, the carbon dioxide separation system can be moved to another integrated coal gasification combined cycle plant and used. This is also advantageous in that alternatively in the case where the carbon dioxide separation system of the invention is used for the removal of carbon dioxide from a natural gas, for example, when the applied gas field is depleted, the carbon dioxide separation system can be moved to another gas field and used, allowing for easy application to small- to middle-sized natural gas fields.

EXPLANATION OF REFERENCE NUMERALS

1: Mixed gas having a carbon dioxide concentration of 3 to 75%
2: Impurity removal device
3: Membrane separation device feed gas
4: Primary carbon dioxide separation device
5: Zeolite membrane for carbon dioxide separation
6: Primary permeated gas
7: Primary non-permeate-side gas
8: Secondary carbon dioxide separation device
9: Secondary separated gas containing carbon dioxide
10: Carbon-dioxide-removed gas having a carbon dioxide concentration of 2% or less
11: Carbon-dioxide-concentrated has having a carbon dioxide concentration of 80% or more

MODE FOR CARRYING OUT THE INVENTION

Next, embodiments of the invention will be described with reference to the drawings. However, the invention is not limited thereto.

Figure 1:
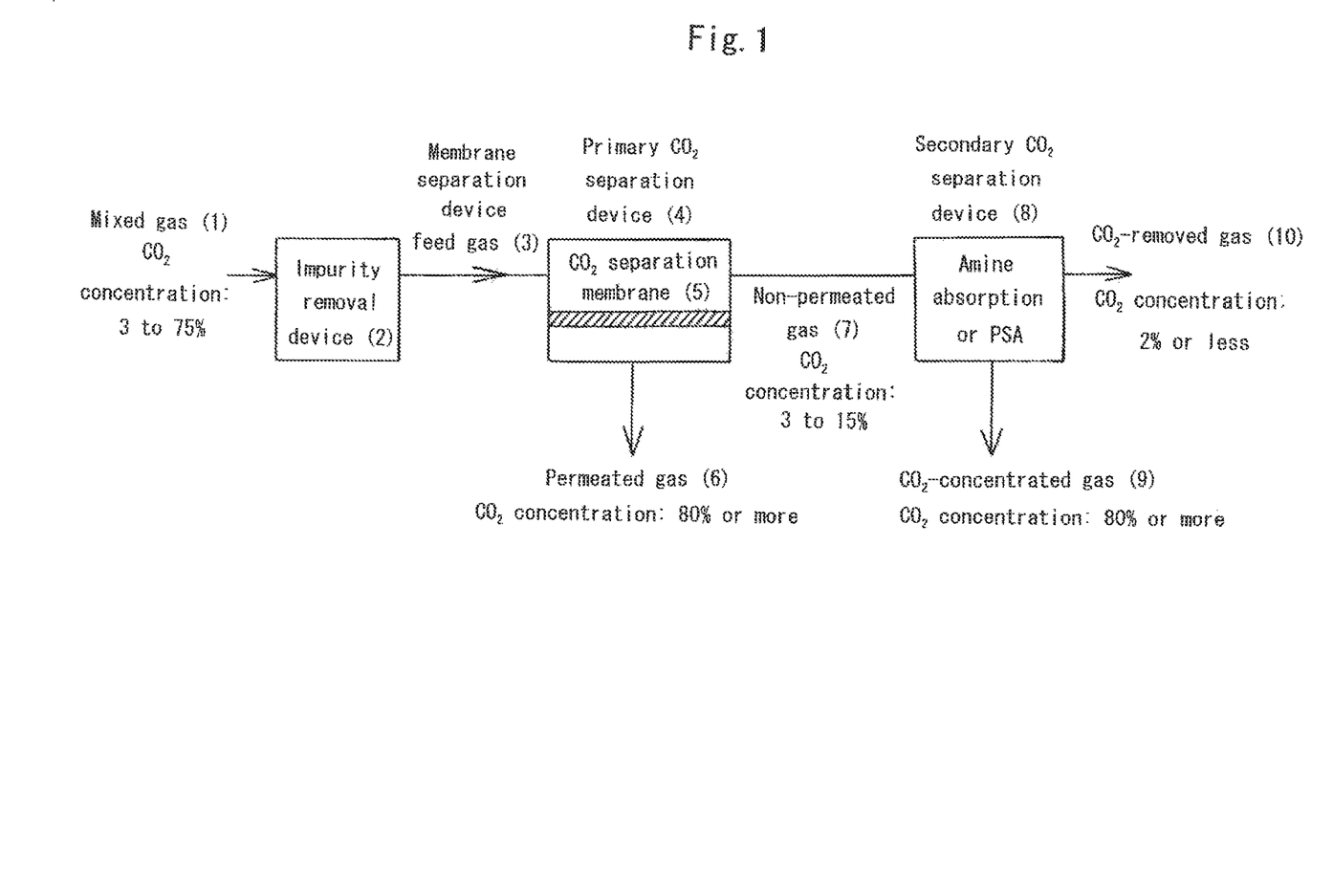
FIG. 1 is a flow sheet showing a first embodiment of the carbon dioxide separation system of the invention.

FIG. 1 is a flow sheet showing a first embodiment of the carbon dioxide separation and recovery system of the invention, which is a hybrid of a zeolite membrane and an amine absorption method or a pressure swing adsorption (PSA) method.

That is, as mentioned above, the present inventors have found that by a hybrid system that combines a membrane separation method using a zeolite membrane for carbon dioxide separation including a zeolite membrane layer with an amine absorption method or a pressure swing adsorption (PSA) method to have a specific arrangement and operating conditions, a carbon-dioxide-containing mixed gas can be highly efficiently separated into a high-concentration carbon dioxide gas having a carbon dioxide concentration of 80% or more and a carbon-dioxide-removed gas having a carbon dioxide concentration of 2% or less, and thus accomplished the invention.

With reference to the figure, the carbon dioxide separation system of the invention is characterized in that a mixed can (1) having a carbon dioxide concentration of 3 to 75% is introduced into a primary carbon dioxide separation device (4) equipped with a zeolite membrane (5) for carbon dioxide separation to produce a primary permeated gas (6) having a carbon dioxide concentration of 80% or more on the permeate side of the zeolite membrane (5) for carbon dioxide separation and also reduce the carbon dioxide concentration of a primary gas (7) on the non-permeate side of the zeolite membrane (5) for carbon dioxide separation to 3 to 15%, and then the primary gas (7) on the non-permeate side is introduced into a secondary carbon dioxide separation device (8) that employs an amine absorption method or a pressure swing adsorption method (PSA) to produce a secondary separated gas (9) having a carbon dioxide concentration of 80% or more separated by the secondary carbon dioxide separation device (8) and also produce a carbon-dioxide-removed gas (10) having a carbon dioxide concentration of 2% or less. According to the invention, a mixed gas having a wide range of carbon dioxide concentration and pressure can be efficiently separated into a high-concentration carbon dioxide gas and a carbon-dioxide-removed gas.

Here, as the zeolite-containing zeolite membrane for carbon dioxide separation, one having a porous substrate in the form of a tube or a hollow fiber and a zeolite membrane formed thereon can be used. Under high-pressure conditions, a tubular form is more preferable in terms of the pressure resistance of the membrane element. In addition, as the driving force for membrane permeation, it is possible to use the autogenous pressure of the mixed gas (1), pressurization of a membrane separation device feed gas (3) by a compressor (not shown), depressurization on the membrane permeate side by a vacuum pump (not shown), etc.

As compared specifically with a single process by an amine absorption method or a pressure swing adsorption (PSA) method alone, in which the facility size, facility cost, and energy consumption increase in proportion to an increase in the concentration of carbon dioxide as a process gas, the carbon dioxide separation system of the invention is advantageous in that the facility size, facility cost, and energy consumption can be reduced by the application of zeolite membrane separation to a region of high concentration of carbon dioxide.

In addition, as compared with a single process by zeolite membrane separation alone, in which the separation efficiency decreases with a decrease in the concentration of carbon dioxide as a process gas, carbon dioxide can be separated with high selectivity by the application of an amine absorption method or a pressure swing adsorption (PSA) method to a region of low concentration of carbon dioxide.

Further, because zeolite membrane is used as the zeolite membrane for carbon dioxide separation, membrane degradation, such as membrane plasticization by high-pressure carbon dioxide seen in an existing organic polymer membrane, does not occur.

Figure 2:
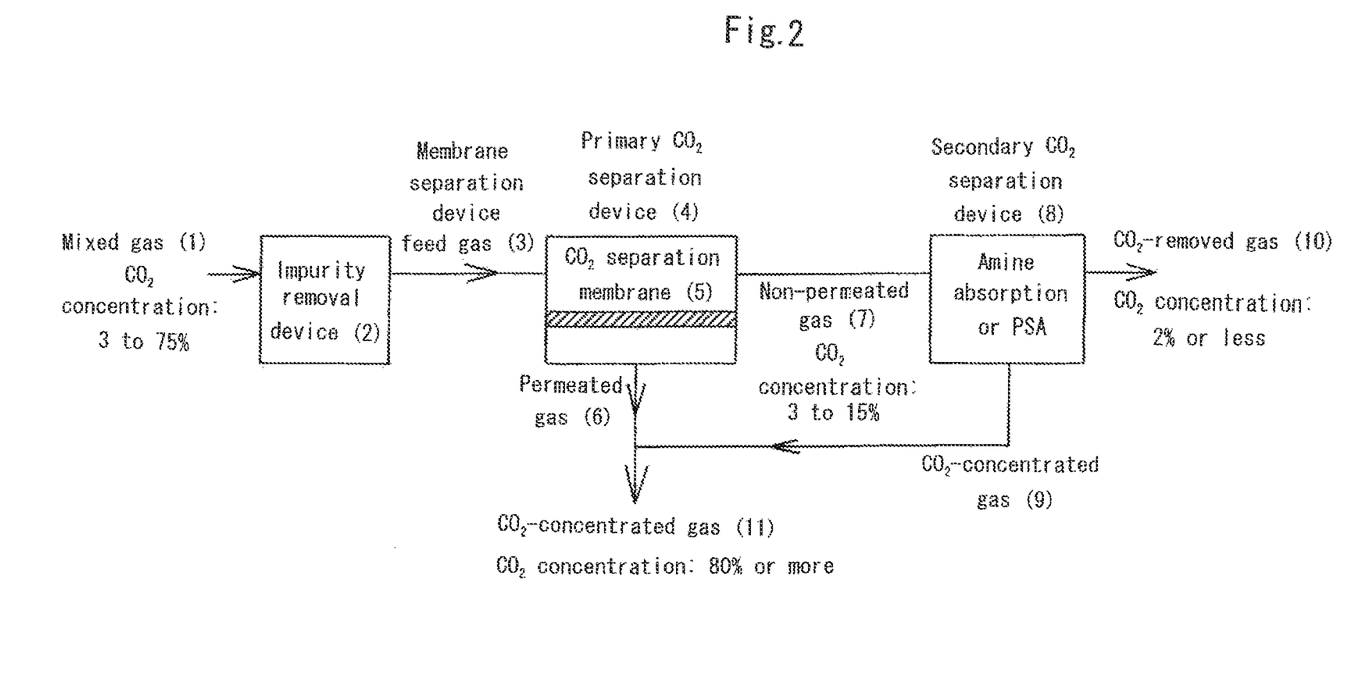
FIG. 2 is a flow sheet showing a second embodiment of the carbon dioxide separation system of the invention.

FIG. 2 is a flow sheet showing a second embodiment of the carbon dioxide separation system of the invention.

With reference to the figure, the carbon dioxide separation system of the invention is characterized in that a mixed gas (1) having a carbon dioxide concentration of 3 to 75% is introduced into a primary carbon dioxide separation device (4) equipped with a zeolite membrane (5) for carbon dioxide separation to produce a primary permeated gas (6) containing permeated carbon dioxide on the permeate side of the zeolite membrane (5) for carbon dioxide separation and also reduce the carbon dioxide concentration of a primary gas (7) on the non-permeate side of the zeolite membrane (5) for carbon dioxide separation to 3 to 15%, then the primary gas (7) on the non-permeate side is introduced into a secondary carbon dioxide separation device (8) that employs an amine absorption method or a pressure swing adsorption (PSA) method to produce secondary separated gas (9) containing carbon dioxide separated by the secondary carbon dioxide separation device (8) and also produce a carbon-dioxide-removed gas (10) having a carbon dioxide concentration of 2% or less, and the primary permeated gas (6) containing carbon dioxide discharged from the zeolite membrane (5) for carbon dioxide separation and the secondary separated gas (9) containing carbon dioxide discharged from the secondary carbon dioxide separation device (8) are mixed to produce a carbon-dioxide-concentrated gas (11) having a carbon dioxide concentration of 80% or more. According to the invention, similarly, a mixed gas having a wide range of carbon dioxide concentration and pressure can be efficiently separated into a high-concentration carbon dioxide gas and a carbon-dioxide-removed gas.

In the carbon dioxide separation system of the invention, it is preferable that the zeolite membrane (5) for carbon dioxide separation includes a faujasite (FAU)-type zeolite membrane layer.

This is advantageous in that because of the strong adsorption between a FAU-type zeolite membrane and carbon dioxide, carbon dioxide can be permeated and separated with high selectivity from a gas such as hydrogen ($H_2$), methane, nitrogen ($N_2$), or oxygen ($O_2$).

Here, the FAU-type zeolite membrane is not particularly limited, and it is possible to use, for example, a FAU-type zeolite membrane (trade name, NaY-type zeolite membrane, manufactured by Hitachi Zosen Corporation).

Further, in the carbon dioxide separation system of the invention, the invention of claim 5 is the carbon dioxide separation system according to any one of claims 1 to 3, and it is preferable that the zeolite membrane (5) for carbon dioxide separation includes a chabazite (CHA)-type zeolite membrane layer, such as SAPO-34.

This is advantageous in that because of the uniform, rigid 0.38-nm pore structure of CHA-type zeolite, small-molecule carbon dioxide (0.33 am) can be permeated and removed with high selectivity from large-molecule methane (0.38 am) like a molecular sieve.

Here, the CHA-type zeolite membrane is not particularly limited and can be synthesized, for example, by a method in which in a reaction solution prepared to have the composition $Al_2O_3:P_2O_3:0.32SiO_2:TEAOH:1.6DPA:150H_2O$, SAPO-34 seed crystals densely applied on a porous support are hydrothermally synthesized for 6 hours at 220° C. (see, e.g., Nonpatent Document 2: S. Li et al., "Scale-up of SAPO-34 membrane for $CO_2/CH_4$ separation", Journal of Membrane Science 352 (2010), 7-13).

Further, in the carbon dioxide separation system of the invention, it is preferable that the zeolite membrane (5) for carbon dioxide separation includes a ZSM-5 (MFI)-type zeolite membrane layer.

This is advantageous in that although the carbon dioxide permeation and separation performance is inferior to a FAU-type zeolite membrane, high durability can be obtained.

Here, the ZSM-5-type zeolite membrane is not particularly limited and can be synthesized, for example, by a method in which in a reaction solution prepared to $10Na_2O:0.15Al_2O_3:36SiO_2:1200H_2O$, ZSM-5 seed crystals densely applied on a porous support are hydrothermally synthesized for 12 hours at 180° C. (see, e.g., Nonpatent Document 3: K. Sawamura et al., "Reverse-Selective Microporous Membrane for Gas Separation", Chem. Asian J. 4 (2009) 1070-1077).

Further, in the carbon dioxide separation system of the invention, it is preferable that the zeolite membrane (5) for carbon dioxide separation includes a DDR-type zeolite membrane layer.

This is advantageous in that because of the hydrophobicity of a DDR-type zeolite membrane, the membrane permeation of carbon dioxide can be prevented from being inhibited by moisture. At the same time, because of the difference in diffusibility in the pore structure of a DDR-type zeolite membrane layer, carbon dioxide can be permeated and separated from methane with high selectivity.

Here, the DDR-type zeolite membrane is not particularly limited and can be synthesized, for example, by a method in which in a reaction solution prepared such that the molar ratio (1-adamantane amine/silica)=0.125, (ethylenediamine/1-adamantane amine)=16, and (water/silica) =56, DDR seed crystals densely applied on a porous support are hydrothermally synthesized for 48 hours at 160° C. (see, e.g., Japanese Patent No. 4204273).

Further, in the carbon dioxide separation system of the invention, it is preferable that the zeolite membrane (5) for carbon dioxide separation includes a zeolite membrane layer dehydrated by heating at a temperature of 100 to 600° C. for drying and then kept in the dry state.

The inside of zeolite membrane pores can be kept in a dry state, for example, by drying a membrane separation device feed gas in an impurity removal device (2) and also heating the zeolite membrane by a heater (not shown in the figure) in the primary carbon dioxide separation device (4) to a temperature of 100 to 600° C., preferably 150 to 300° C.

This is advantageous in that crystal water in the zeolite pores is removed, whereby high carbon dioxide permeability can be obtained.

Further, it is preferable that the carbon dioxide separation system of the invention is for being installed in an integrated coal gasification combined cycle plant and used for the removal of carbon dioxide from a gas that has undergone an exhaust gas shift reaction or for being installed in a natural gas purification plant in a natural gas field and used for the removal of carbon dioxide from a natural gas, and the carbon dioxide separation system is movable on land or at sea after the integrated coal gasification combined cycle plant or the natural gas purification plant is closed.

This is advantageous in that in the case where the carbon dioxide separation system of the invention is used for the removal of carbon dioxide from a gas that has undergone an exhaust gas shift reaction in an integrated coal gasification combined cycle plant, for example, after the integrated coal gasification combined cycle plant is closed, the carbon dioxide separation system can be moved to another integrated coal gasification combined cycle plant and used. This is also advantageous in that alternatively in the case where the carbon dioxide separation system of the invention is used for the removal of carbon dioxide from a natural gas, etc., for example, when the applied gas field is depleted, the carbon dioxide separation system can be moved to another gas field and used, allowing for easy application to small- to middle-sized natural gas fields.

EXAMPLES

Hereinafter, examples of the invention will be described, but the invention is not limited thereto.

Example 1

The carbon dioxide separation and recovery system of the invention was implemented according to the flow sheet shown in FIG. 1.

With reference to the figure, a mixed gas (1) having a carbon dioxide concentration of 20% containing carbon dioxide ($CO_2$) and also containing nitrogen ($N_2$), oxygen ($O_2$), and impurities including water ($H_2O$), hydrogen sulfide ($H_2S$) nitrogen oxides (NOx), and sulfur oxides (SOx) was first introduced into an upstream impurity removal device (2) equipped with an adsorbent, such as zeolite, for removing the impurities. As a result, a primary carbon dioxide separation device (4) and a zeolite membrane (5) for carbon dioxide separation, which are provided downstream, were successfully prevented from being contaminated and degraded by the impurities.

Next, a membrane separation device feed gas (3) was introduced into the primary carbon dioxide separation device (4) equipped with the zeolite membrane (5) for carbon dioxide separation. Here, as the zeolite membrane (5) for carbon dioxide separation, a FAU-type zeolite membrane in the form of a tube (trade name, NaY-type zeolite membrane, manufactured by Hitachi Zosen Corporation) was used. Thus, a primary permeated gas (6) having a carbon dioxide concentration of 95% was produced on the permeate side of the zeolite membrane (5) for carbon dioxide separation, while the carbon dioxide concentration of a primary gas (7) on the non-permeate side of the zeolite membrane (5) for carbon dioxide separation was reduced to 10%.

Next, the primary gas (7) on the non-permeate side was introduced into a secondary carbon dioxide separation device (8) that employs an amine absorption method by an alkanolamine or a pressure swing adsorption (PSA) method to produce a secondary separated gas (9) having a carbon dioxide concentration of 99% separated by the secondary carbon dioxide separation device (8) and also produce a carbon-dioxide-removed gas (10) having a carbon dioxide concentration of 2% or less.

According to Example 1, it was possible to efficiently separate a mixed gas having a wide range of carbon dioxide concentration and pressure into a high-concentration carbon dioxide gas and a carbon-dioxide-removed gas.

Incidentally, as the driving force for membrane permeation, depressurization on the membrane permeation side by a vacuum pump (trade name: oil-sealed rotary vacuum pump, manufactured by ULVAC) was used.

As compared specifically with a single process by an amine absorption method alone, in which the facility size, facility cost, and energy consumption increase in proportion to an increase in the concentration of carbon dioxide as a process gas, in the carbon dioxide separation system of Example 1 of the invention, the facility size, facility cost, and energy consumption can be reduced by the application of zeolite membrane separation to a region of high concentration of carbon dioxide.

In addition, as compared with a single process by zeolite membrane separation alone, in which the separation efficiency decreases with a decrease in the concentration of carbon dioxide as a process gas, carbon dioxide can be separated with high selectivity by the application of an amine absorption method to a region of low concentration of carbon dioxide.

Further, because a FAU-type zeolite membrane is used as a zeolite membrane for carbon dioxide separation, membrane degradation, such as membrane plasticization by high-pressure carbon dioxide seen in an existing organic polymer membrane, does not occur.

Example 2

The carbon dioxide separation and recovery system of the invention was implemented according to the flow sheet shown in FIG. 2. Here, the difference from Example 1 is that a primary gas (7) on the non-permeate side of a zeolite membrane (5) for carbon dioxide separation was introduced into a secondary carbon dioxide separation device (8) that employs a pressure swing adsorption (PSA) method using zeolite 13X as a carbon dioxide recovery/separation material to produce a secondary separated gas (9) containing carbon dioxide separated by the secondary carbon dioxide separation device (8) and also produce a carbon-dioxide-removed gas (10) having a carbon dioxide concentration of 2% or less, and a primary permeated gas (6) containing carbon dioxide discharged from the zeolite membrane (5) for carbon dioxide separation and the secondary separated gas (9) containing carbon dioxide discharged from the secondary carbon dioxide separation device (8) were mixed to produce a carbon-dioxide-concentrated gas (11) having a carbon dioxide concentration of 96%.

According to Example 2, similarly, it was possible to efficiently separate a mixed gas having a wide range of carbon dioxide concentration and pressure into a high-concentration carbon dioxide gas and a carbon-dioxide-removed gas.

As compared specifically with a single process by a pressure swing adsorption (PSA) method alone, in which the facility size, facility cost, and energy consumption increase in proportion to an increase in the concentration of carbon dioxide as a process gas, in the carbon dioxide separation system of Example 2 of the invention, the facility size, facility cost, and energy consumption can be reduced by the application of zeolite membrane separation to a region of high concentration of carbon dioxide.

In addition, as compared with a single process by zeolite membrane separation alone, in which the separation efficiency decreases with a decrease in the concentration of carbon dioxide as a process gas, carbon dioxide can be separated with high selectivity by the application of a pressure swing adsorption (PSA) method to a region of low concentration of carbon dioxide.

Further, because a FAU-type zeolite membrane is used as a zeolite membrane for carbon dioxide separation, membrane degradation, such as membrane plasticization by high-pressure carbon dioxide seen in an existing organic polymer membrane, does not occur.

The invention claimed is:

1. A carbon dioxide separation system, characterized in that a mixed gas (1) having a carbon dioxide concentration of 3 to 75% is introduced into a primary carbon dioxide separation device (4) equipped with a zeolite membrane (5) for carbon dioxide separation to produce a primary permeated gas (6) having a carbon dioxide concentration of 80% or more on the permeate side of the zeolite membrane (5) for carbon dioxide separation and also reduce the carbon dioxide concentration of a primary gas (7) on the non-permeate side of the zeolite membrane (5) for carbon dioxide separation to 3 to 15%, and then the primary gas (7) on the non-permeate side is introduced into a secondary carbon dioxide separation device (8) that employs an amine absorption method or a pressure swing adsorption (PSA) method to produce a secondary separated gas (9) having a carbon dioxide concentration of 80% or more separated by the secondary carbon dioxide separation device (8) and also produce a carbon-dioxide-removed gas (10) having a carbon dioxide concentration of 2% or less.

2. A carbon dioxide separation system, characterized in that a mixed gas (1) having a carbon dioxide concentration of 3 to 75% is introduced into a primary carbon dioxide separation device (4) equipped with a zeolite membrane (5) for carbon dioxide separation to produce a primary permeated gas (6) containing permeated carbon dioxide on the permeate side of the zeolite membrane (5) for carbon dioxide separation and also reduce the carbon dioxide concentration of a primary gas (7) on the non-permeate side of the zeolite membrane (5) for carbon dioxide separation to 3 to 15%, then the primary gas (7) on the non-permeate side is introduced into a secondary carbon dioxide separation device (8) that employs an amine absorption method or a pressure swing adsorption (PSA) method to produce a secondary separated gas (9) containing carbon dioxide separated by the secondary carbon dioxide separation device (8) and also produce a carbon-dioxide-removed gas (10) having a carbon dioxide concentration of 2% or less, and the primary permeated gas (6) containing carbon dioxide discharged from the zeolite membrane (5) for carbon dioxide separation and the secondary separated gas (9) containing carbon dioxide discharged from the secondary carbon dioxide separation device (8) are mixed to produce a carbon-dioxide-concentrated gas (11) having a carbon dioxide concentration of 80% or more.

3. The carbon dioxide separation system according to claim 1, characterized in that the mixed gas (1) having a carbon dioxide concentration of 3 to 75% is a gas containing carbon dioxide ($CO_2$) and also containing at least one gas selected from the group consisting of hydrogen ($H_2$), nitrogen ($N_2$), oxygen ($O_2$), and methane and at least one impurity selected from the group consisting of water ($H_2O$), hydrogen sulfide ($H_2S$), nitrogen oxides (NOx), sulfur oxides (SOx), and hydrocarbons other than methane, and an impurity removal device (2) for removing the impurity is provided upstream of the primary carbon dioxide separation device (4) equipped with the zeolite membrane (5) for carbon dioxide separation.

4. The carbon dioxide separation system according to claim 1, characterized in that the zeolite membrane (5) for carbon dioxide separation includes a faujasite (FAU)-type zeolite membrane layer.

5. The carbon dioxide separation system according to claim 1, characterized in that the zeolite membrane (5) for carbon dioxide separation includes a chabazite (CHA)-type zeolite membrane layer.

6. The carbon dioxide separation system according to claim 1, characterized in that the zeolite membrane (5) for carbon dioxide separation includes a ZSM-5 (MFI)-type zeolite membrane layer.

7. The carbon dioxide separation system according to claim 1, characterized in that the zeolite membrane (5) for carbon dioxide separation includes a DDR-type zeolite membrane layer.

8. The carbon dioxide separation system according to claim 1, characterized in that the zeolite membrane (5) for carbon dioxide separation includes a zeolite membrane layer dehydrated by heating at a temperature of 100 to 600° C. for drying and then kept in the dry state.

9. The carbon dioxide separation system according to claim 1, characterized in that the carbon dioxide separation system is for being installed in an integrated coal gasification combined cycle plant and used for the removal of carbon dioxide from a gas that has undergone an exhaust gas shift reaction or for being installed in a natural gas purification plant in a natural gas field and used for the removal of carbon dioxide from a natural gas, and the carbon dioxide separation system is movable on land or at sea after the integrated coal gasification combined cycle plant or the natural gas purification plant is closed.

10. The carbon dioxide separation system according to claim 2, characterized in that the mixed gas (1) having a carbon dioxide concentration of 3 to 75% is a gas containing carbon dioxide ($CO_2$) and also containing at least one gas selected from the group consisting of hydrogen ($H_2$), nitrogen ($N_2$), oxygen ($O_2$), and methane and at least one impurity selected from the group consisting of water ($H_2O$), hydrogen sulfide ($H_2S$), nitrogen oxides (NOx), sulfur oxides (SOx), and hydrocarbons other than methane, and an impurity removal device (2) for removing the impurity is provided upstream of the primary carbon dioxide separation device (4) equipped with the zeolite membrane (5) for carbon dioxide separation.

11. The carbon dioxide separation system according to claim 2, characterized in that the zeolite membrane (5) for carbon dioxide separation includes a faujasite (FAU)-type zeolite membrane layer.

12. The carbon dioxide separation system according to claim 2, characterized in that the zeolite membrane (5) for carbon dioxide separation includes a chabazite (CHA)-type zeolite membrane layer.

13. The carbon dioxide separation system according to claim 2, characterized in that the zeolite membrane (5) for carbon dioxide separation includes a ZSM-5 (MFI)-type zeolite membrane layer.

14. The carbon dioxide separation system according to claim 2, characterized in that the zeolite membrane (5) for carbon dioxide separation includes a DDR-type zeolite membrane layer.

15. The carbon dioxide separation system according to claim 2, characterized in that the zeolite membrane (5) for carbon dioxide separation includes a zeolite membrane layer dehydrated by heating at a temperature of 100 to 600° C. for drying and then kept in the dry state.

16. The carbon dioxide separation system according to claim 2, characterized in that the carbon dioxide separation system is for being installed in an integrated coal gasification combined cycle plant and used for the removal of carbon dioxide from a gas that has undergone an exhaust gas shift reaction or for being installed in a natural gas purification plant in a natural gas field and used for the removal of carbon dioxide from a natural gas, and the carbon dioxide separation system is movable on land or at sea after the integrated coal gasification combined cycle plant or the natural gas purification plant is closed.

* * * * *